United States Patent [19]

Abel et al.

[11] Patent Number: 4,995,889
[45] Date of Patent: Feb. 26, 1991

[54] CONTROL OF PRODUCT WITHDRAWAL FROM A SORPTIVE SEPARATION SYSTEM

[75] Inventors: Alan D. Abel, Allentown; William E. Waldron, North Catasauqua; Theodore F. Wells, Allentown, all of Pa.

[73] Assignee: Air Products and Chemials, Inc., Allentown, Pa.

[21] Appl. No.: 484,590

[22] Filed: Feb. 23, 1990

[51] Int. Cl.⁵ .............................................. B01D 53/04
[52] U.S. Cl. .......................................... 55/21; 55/25; 55/179; 55/218
[58] Field of Search ...................... 55/21, 25, 26, 160, 55/163, 179, 218

[56] References Cited

U.S. PATENT DOCUMENTS

| | | | |
|---|---|---|---|
| 3,230,688 | 1/1966 | Kitchen et al. | 55/20 |
| 3,257,314 | 6/1966 | Kitchen | 55/179 X |
| 3,257,772 | 6/1966 | Maddox et al. | 55/20 |
| 3,282,027 | 1/1966 | Johnson et al. | 55/21 |
| 3,703,068 | 11/1972 | Wagner | 55/21 |
| 3,766,713 | 10/1973 | Leonard | 55/163 X |
| 3,778,967 | 12/1973 | Kauer, Jr. et al. | 55/21 |
| 4,140,495 | 2/1979 | Pietruazewski | 55/21 |
| 4,197,095 | 4/1980 | White, Jr. et al. | 55/20 |
| 4,299,595 | 1/1981 | Renkmann et al. | 55/21 |
| 4,323,370 | 4/1982 | Leitgeb | 55/18 |
| 4,349,357 | 9/1982 | Russell | 55/21 |
| 4,376,640 | 3/1983 | Vo | 55/26 |
| 4,494,966 | 1/1985 | Umeki | 55/26 |
| 4,504,286 | 3/1985 | Carlisle et al. | 55/20 |
| 4,539,019 | 9/1985 | Koch | 55/21 |
| 4,552,571 | 11/1985 | Dechene | 55/21 |
| 4,561,287 | 12/1985 | Rowland | 73/23 |
| 4,561,865 | 12/1985 | McCombs et al. | 55/25 |
| 4,576,614 | 3/1986 | Armond et al. | 55/18 |
| 4,643,743 | 2/1987 | Grader | 55/26 |
| 4,725,293 | 2/1988 | Gunduson | 55/162 |
| 4,747,853 | 5/1988 | Haslett | 55/163 X |
| 4,857,082 | 8/1989 | DiMartino, Sr. et al. | 55/21 X |

FOREIGN PATENT DOCUMENTS 0344917 12/1989 European Pat. Off. .
3501666 7/1986 Fed. Rep. of Germany ........ 55/160

Primary Examiner—Robert Spitzer
Attorney, Agent, or Firm—Geoffrey L. Chase; James C. Simmons; William F. Marsh

[57] ABSTRACT

An apparatus and method for regulating flow of product gas from a sorptive separation apparatus, especially during periods of discontinuous product supply and variable demand is set forth.

18 Claims, 1 Drawing Sheet

CONTROL OF PRODUCT WITHDRAWAL FROM A SORPTIVE SEPARATION SYSTEM

TECHNICAL FIELD

The present invention is directed to gas flow control in the product line of a sorptive gas separation apparatus. More specifically, the present invention is a simplified apparatus for controlling flow of a discontinuous supplied product with a variable withdrawal demand when the product is produced from a pressure swing adsorptive separation apparatus.

BACKGROUND OF THE PRIOR ART

Industrial gases such as oxygen, nitrogen, hydrogen, carbon monoxide and hydrocarbons as well as other industrial gases are the subJect of intense competition to arrive at the most efficiently produced and low cost product as is possible to provide. Many industrial gases have traditionally been produced in large scale plants using cryogenic techniques. The cryogenic supply of industrial gases can be expensive when transportation of such gases from a cryogenic process facility to an end use customer is considered. With the change in users of industrial gases from large basic industries, such as the steel industry with their large consumption needs, to industries which require smaller quantities of industrial gases, cryogenic facilities see greater competition for reduced volumes of industrial gases from alternate industrial gas processing facilities, such as membrane and sorptive separation systems. Sorptive separation systems typically constitute the use of pressure swing to regenerate a plurality of parallel sorptive beds. Unless a large plurality of parallel beds are utilized, pressure swing sorptive systems typically render discontinuous product production. Additionally, customer demand or utilization of industrial gases from pressure swing sorptive systems is typically variable. Problems can arise in maintaining a constant product gas flow from the sorptive system when its discontinuous production is compounded by the variable demand of the ultimate industrial gas user.

Changes in product flow from a pressure swing sorptive system alter the purity produced from the system because of the change in the rate of gas permeation through the sorptive beds. Therefore, the industry has sought ways to achieve constant product purity or at least constant product flow during conditions of discontinuous production and/or variable product withdrawal.

U.S. Pat. No. 4,323,370 discloses an adsorptive process wherein the length of time of operation of the adsorption phase and the rate of flow of a gaseous feed mixture through the adsorber is adjusted in response to fluctuating demand for the product gas.

U.S. Pat. No. 4,576,614 discloses a pressure swing adsorptive separation system utilizing two parallel beds and a product reservoir. Product pressure or flow is standardized by discontinuing the initiation of a new adsorptive step until prescribed values of product gas in the reservoir are reached.

U.S. Pat. No. 4,725,293 discloses a pressure swing adsorption system having two parallel beds and a product reservoir wherein conditions are sensed in the product reservoir and product line and through computer controls the extent of feed gas to the adsorptive system is modified and controlled to result in maintenance of a preselected range of impurity in the product and control of product flow at a relatively high predetermined rate.

Additional patents of interest in this area include U.S. Pat. No. 3,230,688; U.S. Pat. No. 3,257,772; U.S. Pat. No. 3,282,027; U.S. Pat. No. 3,703,068; U.S. Pat. No. 3,778,967; U.S. Pat. No. 4,140,495; U.S. Pat. No. 4,197,095; U.S. Pat. No. 4,299,595; U.S. Pat. No. 4,349,357; U.S. Pat. No. 4,376,640; U.S. Pat. No. 4,494,966; U.S. Pat. No. 4,504,286; U.S. Pat. No. 4,539,019; U.S. Pat. No. 4,552,571; U.S. Pat. No. 4,561,287; U.S. Pat. No. 4,561,865; U.S. Pat. No. 4,576,614; and U.S. Pat. No. 4,643,743.

The prior art has attempted various techniques for maintaining product purity and product flow in an adsorptive separation system. However, these systems are either inadequate, complex or capital intensive and do not meet the needs of a low cost, simple pressure swing adsorptive system particularly wherein a minimum of parallel beds are utilized. The present invention overcomes the drawbacks in a simple, low cost sorptive separation system using a minimum of beds, wherein discontinuous production and variable product demand are experienced, to result in constant product flow at a prescribed minimal range of impurity fluctuation. These desirable attributes are achieved in the present invention which is set forth in greater detail below.

BRIEF SUMMARY OF THE INVENTION

The present invention is a flow control system for the product line of a sorptive gas separation apparatus, comprising., a pneumatically opened control valve connected to the product line of the separation apparatus to control flow of the product there through, a variable or fixed orifice device connected to the product line upstream of the control valve, a differential pressure controller having conduits to sense pressure upstream and downstream of the orifice device and a conduit to deliver a pneumatic signal to the control valve proportional to the difference between a set desired differential pressure and the differential of the sensed pressures from upstream and downstream of the orifice device, and a conduit for providing pneumatic instrument gas at elevated pressure to the controller only during such times as product gas is produced from the sorptive gas separation apparatus. It is also possible to locate the variable or fixed orifice device downstream of the control valve, alternatively.

Preferably, the conduit for providing pneumatic instrument gas comprises a gas line communicating with the controller through a remotely actuated switching valve operated to activate to an open position during the production stage of the adsorptive gas separation apparatus. More preferably, the switching valve is a solenoid valve. Preferably, a pressure regulating valve is connected to the gas line downstream or upstream of the switching valve.

Preferably, the orifice device is a manually adjustable valve.

Preferably, the control valve has a spring for closing the valve and a pneumatically sensitive diaphragm for counteracting the spring by pneumatic actuation to open the valve.

Preferably, the gas line communicates with a source of instrument air.

Alternatively, the gas line communicates with the product line upstream of the orifice device.

Alternately, the conduit for providing pneumatic instrument gas comprises a gas line communicating with said controller from the product line upstream of the orifice device through a backpressure regulating valve and a second pressure regulating valve, downstream of said backpressure regulating valve.

The present invention also encompasses a method for maintaining relatively constant flow of product gas from the sorptive gas separation apparatus when the product gas withdrawal rate periodically varies on demand over multiple cycles from a design rate to increased rates substantially above said design rate, comprising: continuously measuring the pressure drop across a variable or fixed orifice device by sensing the pressure upstream and downstream of the device, providing a pneumatic signal proportional to the difference between a set desired pressure drop and the measured pressure drop to a pneumatically opened control valve in a product gas flow line and adjusting the flow of product gas in the product gas flow line by opening or closing the control valve proportional to the pneumatic signal.

Preferably, the pneumatic signal is provided by pneumatic instrument gas.

Preferably, the pneumatic instrument gas is provided only at such times as the sorptive gas separation apparatus is producing product gas at a predetermined minimum pressure.

Preferably, the pneumatic instrument gas is controlled by a solenoid valve actuated during product gas production.

Preferably, the pneumatic instrument gas from the solenoid valve is adjusted to a set pressure by passage through a pressure regulating valve.

Preferably, the pneumatic instrument gas is instrument air.

Preferably, the pneumatic instrument gas is provided from the product gas flow line upstream of the control valve through a backpressure regulator valve and a pressure regulating valve.

DETAILED DESCRIPTION OF THE INVENTION

Figure 2:
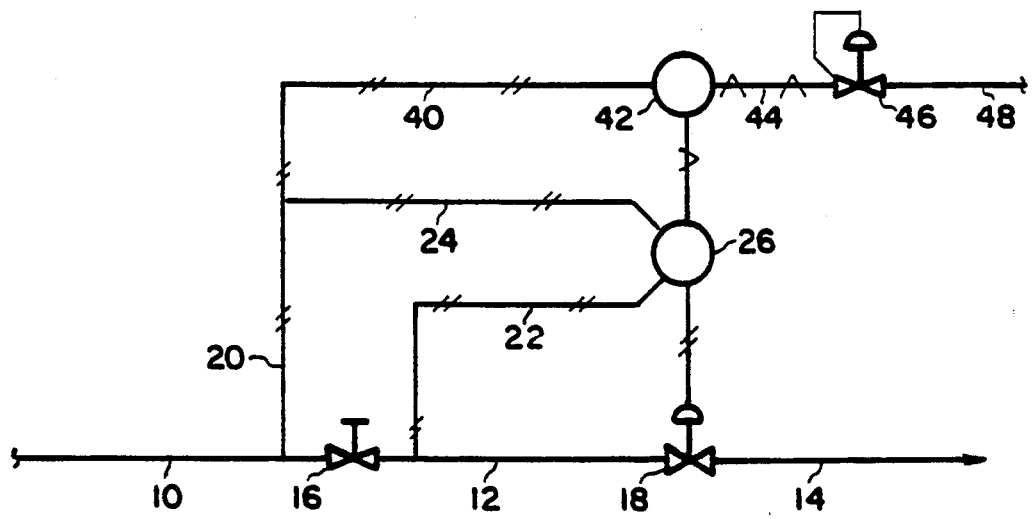
FIG. 2 is an alternate embodiment of the flow control method and system of the present invention.

The present invention is an apparatus and method for a differential pressure control system for regulating the product gas withdrawal rate from a pressure swing sorptive gas separation system. The major components of the invention include a pneumatically operated control valve driven by a differential pressure controller which receives instrument gas or instrument air through an on/off switching device or valve and a pressure reduction valve. The differential pressure of the product gas is measured across a variable or fixed orifice device. Control of the differential pressure provides indirect regulation of product gas flow which in turn controls indirectly the product gas purity. The supply of instrument gas or instrument air to the differential pressure controller is interrupted by the switching device or valve during the portion of the pressure swing systems cycle when no product gas is produced. This causes the normally closed control valve to shut closed by spring actuation in the absence of pneumatically driven opening force. Supply of instrument gas or instrument air is resumed at such time when the pressure swing sorptive gas separation system is again able to produce product gas in the product gas line at some minimum pressure. Because the invention does not rely on a flow measurement for proper operation, it avoids the control problems associated with a varying upstream flow. The switching device or valve, which controls instrument gas, and the differential pressure controller provide constant product gas flow at the appropriate times. The cost of the present invention is roughly half that of a typical flow control loop.

The present invention overcomes the difficulty in obtaining stable and repeatable control of product flow from a pressure swing sorptive gas separation system with simple and inexpensive components. The characteristic abrupt flow changes associated with pressure swing sorptive systems can be handled by modifications to standard flow control loops, but only at costs prohibitive for small systems in the range of approximately 20,000 SCF/hr or less. Low capital costs are essential for competing in the technology of industrial gases produced by pressure swing sorptive separation units in the above size ranges, especially in the area of nitrogen production. Good flow control during start-up, irregular product withdrawal, as well as normal operating conditions is essential for reliable supply of constant purity product from a pressure swing sorptive gas separation system, and the present invention supplies such reliability and low cost as will be set forth below. Sorptive systems as the term is used in this invention include absorption and adsorption processes.

The flow control system of the present invention comprises generally five components: (1) a pneumatically operated control valve, (2) a differential pressure controller, (3) a manually variable or fixed throttling valve or flow orifice, (4) an instrument gas regulator, and (5) an on/off instrument gas switching device which can be a simple pressure controller, a back pressure regulator or a solenoid valve. The present invention will now be set forth in greater detail with reference to FIG. 1.

Figure 1:
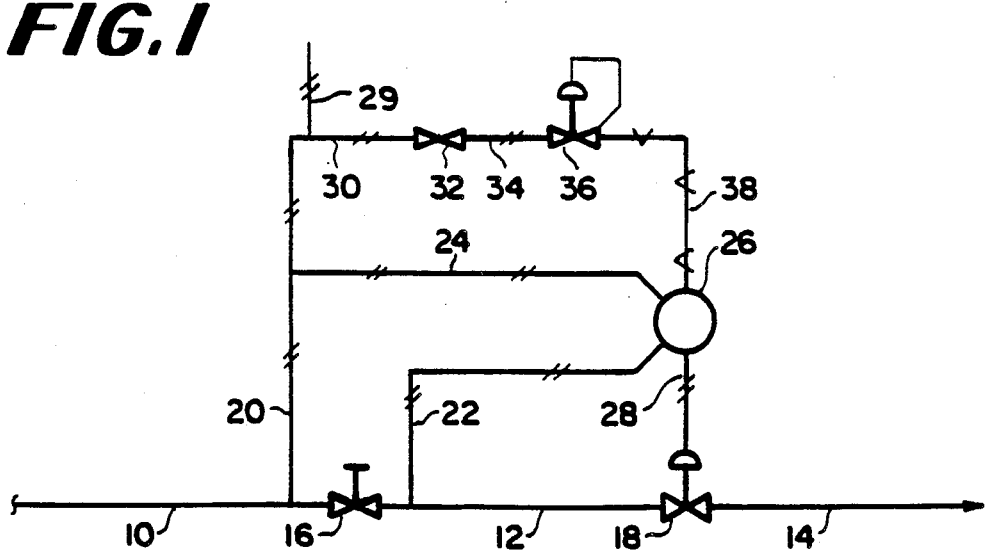
FIG. 1 is a schematic illustration of a preferred embodiment of the flow control method and system of the present invention.

In FIG. 1, product gas flows through product gas line 10 from a pressure swing sorptive separation system such as a pressure swing adsorptive separation of air into oxygen and a nitrogen product. The product gas passes through a manual adjustable throttling valve 16 which induces a pressure drop across the orifice of valve 16. The pressure drop is communicated by gas lines 20 and 22, which provide a pressure sensing upstream and downstream, respectively, of the valve 16. The upstream gas in line 20 is in part communicating with a differential pressure controller 26 through gas line 24, while the downstream product gas communicates its pressure to the differential pressure controller 26 through gas line 22.

The differential pressure controller senses the pressure of the product gas upstream and downstream of valve 16 typically by a diaphragm which is interposed between the inputs from the two gas lines, and in turn, the positioning of the diaphragm in the differential pressure controller relative to a set desired differential pressure provides a proportional pressure of instrument gas or instrument air by line 28 to a pneumatically opened control valve 18 in the product gas flow line. The instrument gas in line 28 operates against a diaphragm in valve 18 to counteract a spring which maintains valve 18 in a normally closed condition. The instrument gas in line 28 which is provided in a 3-15 psig range typically operates the diaphragm to open the valve against the spring action proportional to the amount of signal provided by the differential pressure controller 26.

As product gas now in line 12 passes through valve 18 its flow is adjusted based upon and proportional to the pressure drop across the orifice provided by valve 16. Therefore, ultimate product flow from the system and available for withdrawal by an end use customer in line 14 is accurately controlled by sensing pressure drop across valve 16 and making appropriate adjustments in valve 18. In an alternate embodiment not illustrated, valve 16 can be downstream of valve 18.

Instrument gas to operate valve 18 by way of differential pressure controller 26 can be provided preferably by a portion of the product gas upstream of valve 16 derived from gas line 20 and gas line 30 to a switching valve, such as solenoid valve 32, which is operated from the control system of the pressure swing adsorptive gas separation system so as only to be opened during times that one or more adsorption beds are on adsorption duty and actually producing product gas. Otherwise, the solenoid valve would be closed which deactivates the differential pressure controller 26 and closes the normally spring closed valve 18. This precludes removal of product gas when production of product gas is low or ceases and therefore avoids surges of feed gas through sorptive beds due to low pressure conditions in product lines when the sorptive system is switching between regeneration and a new adsorption stage. When solenoid valve 32 is opened, product gas constituting instrument gas in line 34 is delivered through a pressure reduction valve 36 to provide instrument gas of approximately 20 psig in line 38 to the differential pressure controller 26 for proportional use in line 28 to activate valve 18.

Instrument gas supplied to solenoid valve 32 can also come from downstream of valve 16 {not illustrated}or alternatively from instrument air in gas line 29. Although valve 32 is described preferably as a solenoid valve, in practice it can be any type of remotely actuated switching valve such as the solenoid valve, a pneumatic valve, a cam-operated valve, etc. which is operated by signals distinct from direct communication of the gas pressure condition of the line that the valve operates upon. Alternatively, valve 32 can be a non-switching valve, such as a backpressure regulator valve which would take its instrument gas only from line 10 through gas lines 20 and 30 and would allow this gas to flow to differential controller 26 only upon sensing a set design minimum pressure in gas line 30.

It is also possible to use different valving equipment and different sources of instrument gas than product gas, such as instrument air which is typically known in the industry to be a low pressure air stream provided from appropriate compressed air sources or dedicated compressors for operation of instruments in industrial gas handling systems. Such an embodiment is illustrated in FIG. 2 wherein the system is generally as described in FIG. 1 except for the valving equipment and the source of the instrument gas or in this instance, instrument air. A source of instrument air is illustrated in line 48 which can be a portion of feed air to the upstream pressure swing sorptive separation apparatus which produces nitrogen as a product gas in line 10. The instrument air passes through a pressure reducing regulator or valve 46 and then in gas line 44 is introduced into a set pressure controller 42 which senses product gas pressure in line 40. The set pressure controller 42 senses upstream pressure and allows instrument air to pass to the differential pressure controller 26 only upon the achievement of a minimum pressure in line 40. This results in shutdown of the control system and valve 18 when product gas pressure in line 10 is low, which typically occurs when the beds of the sorptive separation system are not in a product gas producing mode or adsorption mode. In all other respects, the alternate embodiment of FIG. 2 is similar to the preferred embodiment of FIG. 1.

The embodiments of the present invention set forth above are capable of smoothly handling the abrupt reoccurring shut-off of upstream product gas characteristic to pressure swing sorptive systems. The solenoid valve or set pressure controller interrupts the normal action of the differential pressure controller by cutting off its supply of instrument gas or instrument air. This negates the high output signal generated by the differential pressure controller which is trying to open the control valve because of a sensed no flow condition. When the upstream pressure swing sorptive system begins generating product gas again, the control valve is initially closed and a product gas flow surge is averted. Normal differential pressure control resumes at this time when the switching device or solenoid valve provides supply of instrument gas or instrument air again.

The present invention does not require accurate flow measurement for proper operation. A standard flow control loop would require this measurement and its associated components. A direct differential pressure signal is the controlled process parameter and product purity which is directly related to flow is used as the performance and operating standard. As a result the apparatus and method of the present invention provides an efficient, simple and economic mode of controlling product flow and maintaining product purity within the desired range for pressure swing sorptive gas separation apparatus, particularly for smaller gas production needs, such as less than 20,000 SCF/hr. This provides a unique benefit for such systems in the competitive area of small industrial gas generators, such as in the production of nitrogen from non-cryogenic techniques.

The present invention has been set forth with regard to several preferred embodiments, however the scope of the invention should be ascertained from the claims which follow.

We claim:

1. A method for maintaining relatively constant flow of product gas from a sorptive gas separation apparatus wherein the product gas withdrawal rate periodically varies on demand over multiple cycles from approximately its design rate to an increased rate above approximately said design rate, comprising:
   (a) continuously measuring the pressure drop across a variable or fixed orifice device by sensing the pressure upstream and downstream of said device;
   (b) providing a pneumatic signal, which is proportional to the difference between a set desired pressure drop and the measured pressure drop of step (a), to a pneumatically opened control valve in a product gas flow line; and
   (c) adjusting the flow of product gas in said product gas flow line by opening or closing said control valve proportional to said pneumatic signal.

2. The method of claim 1 wherein the pneumatic signal is provided by pneumatic instrument gas.

3. The method of claim 2 wherein said pneumatic instrument gas is provided only at such times as the sorptive gas separation apparatus is producing product gas at some predetermined minimum pressure.

4. The method of claim 3 wherein the pneumatic instrument gas is controlled by a solenoid valve actuated during product gas production.

5. The method of claim 4 wherein the pneumatic instrument gas from said solenoid valve is adjusted to a set pressure by passage through a pressure regulating valve.

6. The method of claim 4 wherein the pneumatic instrument gas is a portion of the product gas from upstream of the orifice device.

7. The method of claim 2 wherein the pneumatic instrument gas is instrument air.

8. The method of claim 2 wherein the instrument gas is provided from the product gas flow line upstream of the control valve through a backpressure regulator valve and a pressure regulating valve.

9. A flow control means for the product line of a sorptive gas separation apparatus, comprising:
  (a) a pneumatically opened control valve connected to the product line of the separation apparatus to control flow of product therethrough,
  (b) a variable or fixed orifice device connected to the product line upstream of said control valve;
  (c) a differential pressure controller having means to sense pressure upstream and downstream of said orifice device and means to deliver a pneumatic signal to said control valve proportional to the difference between a set desired differential pressure and the differential of the sensed pressures from upstream and downstream of said orifice device; and
  (d) means for providing pneumatic instrument gas at elevated pressure to said controller substantially only during such times as product gas is produced from said sorptive gas separation apparatus.

10. The apparatus of claim 9 wherein said means for providing pneumatic instrument gas comprises a gas line communicating with said controller through a remotely actuated switching valve operated to actuate to an open position during the production stage of the sorptive gas separation apparatus.

11. The apparatus of claim 10 wherein said switching valve is a solenoid valve.

12. The apparatus of claim 10 including a pressure regulating valve connected to said gas line upstream or downstream of said switching valve.

13. The apparatus of claim 10 wherein said gas line communicates with a source of instrument air.

14. The apparatus of claim 10 wherein said gas line communicates with the product line upstream of the orifice device.

15. The apparatus of claim 9 wherein orifice device is a manually adjustable valve.

16. The apparatus of claim 9 wherein said control valve has a spring for closing the valve and means for counteracting the spring by pneumatic actuation to open the valve.

17. The apparatus of claim 9 wherein said means for providing pneumatic instrument gas comprises a gas line communicating with said controller from the product line upstream of the orifice device through a backpressure regulating valve and a second pressure regulating valve, downstream of said backpressure regulating valve.

18. A flow control means for the product line of a sorptive gas separation apparatus, comprising:
  (a) a pneumatically opened control valve connected to the product line of the separation apparatus control flow of product therethrough;
  (b) a variable or fixed orifice device connected to the product line downstream of said control valve;
  (c) a differential pressure controller having means to sense pressure upstream and downstream of said orifice device and means to deliver a pneumatic signal to said control valve proportional to the difference between a set desired differential pressure and the differential of the sensed pressures from upstream and downstream of said orifice device; and
  (d) means for providing pneumatic instrument gas at elevated pressure to said controller substantially only during such times as product gas is produced from said sorptive gas separation apparatus.

* * * * *